United States Patent [19]

Van Eck et al.

[11] 4,059,850
[45] Nov. 22, 1977

[54] MEMORY SYSTEM WORD GROUP PRIORITY DEVICE WITH LEAST-RECENTLY USED CRITERION

[75] Inventors: Rudolf Van Eck, Beekbergen; Antonius Cornelis Maria Touw, Eindhoven, both of Netherlands

[73] Assignee: U.S. Philips Corporation, New York, N.Y.

[21] Appl. No.: 723,154

[22] Filed: Sept. 14, 1976

[30] Foreign Application Priority Data

Sept. 17, 1975 Netherlands ..................... 7510904

[51] Int. Cl.² ..................... G06F 13/00; G11C 9/06
[52] U.S. Cl. ..................................................... 364/200
[58] Field of Search .................. 340/172.5; 445/1; 364/200

[56] References Cited

U.S. PATENT DOCUMENTS

| | | | |
|---|---|---|---|
| 3,394,353 | 7/1968 | Bloom et al. | 340/172.5 |
| 3,427,592 | 2/1969 | Bahnsen et al. | 340/172.5 |
| 3,541,529 | 11/1970 | Nelson | 340/172.5 |
| 3,573,750 | 4/1971 | Takashi Ishidate | 340/172.5 |
| 3,699,533 | 10/1972 | Hunter | 340/172.5 |
| 3,958,228 | 5/1976 | Coombes et al. | 340/172.5 |

*Primary Examiner*—Melvin B. Chapnick
*Attorney, Agent, or Firm*—Frank R. Trifari; Daniel R. McGlynn

[57] ABSTRACT

A word group priority device for use in a data processing system having a first store and a relatively faster but smaller capacity second store, which device assigns priorities to word groups on a least recently used basis. Upon the read-out or read-in of a word group, (m)- bit priority codes are generated, the first (k) bits thereof serving to identify a group having the lowest priority, the further (m - k) bits serving to code all priority combinations for the groups which do not have the lowest priority. During a read, write, or replacement operation, the device can be used to lower the priority of all non-accessed word groups while assigning the highest priority to the accessed word group, and can also be used to raise the priority of all remaining word groups when one group has been invalidated by assigning to it the lowest priority.

4 Claims, 11 Drawing Figures

| WG | P min.code | | | |
|---|---|---|---|---|
| | k=2 | | k=3 | |
| | n=3 | n=4 | n=5 | n=6 |
| A | 0 0 | 0 0 | 0 0 0 | 0 0 0 |
| B | 0 1 | 0 1 | 0 0 1 | 0 0 1 |
| C | 1 0 | 1 0 | 0 1 0 | 0 1 0 |
| D | * | 1 1 | 0 1 1 | 0 1 1 |
| E | | | 1 0 0 | 1 0 0 |
| F | | | * | 1 0 1 |
| | | | * | * |
| | | | * | * |

Fig. 2

| | U | | | I | | |
|---|---|---|---|---|---|---|
| | A | B | C | A | B | C |
| A B C | A B C | A B C | A B C | A B C | A B C | A B C |
| 0 1 2 | 0 1 2 | 1 0 2 | 1 2 0 | 2 0 1 | 0 2 1 | 0 1 2 |
| 0 2 1 | 0 2 1 | 1 0 2 | 1 2 0 | 2 1 0 | 0 2 1 | 0 1 2 |
| 1 0 2 | 0 1 2 | 1 0 2 | 2 1 0 | 2 0 1 | 0 2 1 | 1 0 2 |
| 1 2 0 | 0 2 1 | 2 0 1 | 1 2 0 | 2 1 0 | 1 2 0 | 0 1 2 |
| 2 0 1 | 0 1 2 | 2 0 1 | 2 1 0 | 2 0 1 | 1 2 0 | 1 0 2 |
| 2 1 0 | 0 2 1 | 2 0 1 | 2 1 0 | 2 1 0 | 1 2 0 | 1 0 2 |

Fig. 3

| | U | | | I | | |
|---|---|---|---|---|---|---|
| | A | B | C | A | B | C |
| 1 0 0 | 1 0 0 | 1 0 1 | 0 1 1 | 0 0 0 | 0 1 0 | 1 0 0 |
| 0 1 0 | 0 1 0 | 1 0 1 | 0 1 1 | 0 0 1 | 0 1 0 | 1 0 0 |
| 1 0 1 | 1 0 0 | 1 0 1 | 0 0 1 | 0 0 0 | 0 1 0 | 1 0 1 |
| 0 1 1 | 0 1 0 | 0 0 0 | 0 1 1 | 0 0 1 | 0 1 1 | 1 0 0 |
| 0 0 0 | 1 0 0 | 0 0 0 | 0 0 1 | 0 0 0 | 0 1 1 | 1 0 1 |
| 0 0 1 | 0 1 1 | 0 0 0 | 0 0 1 | 0 0 1 | 0 1 1 | 1 0 1 |

Fig. 4

| | U | | | | I | | | |
|---|---|---|---|---|---|---|---|---|
| | A | B | C | D | A | B | C | D |
| A B C D | A B C D | A B C D | A B C D | A B C D | A B C D | A B C D | A B C D | A B C D |
| 0 1 2 3 | 0 1 2 3 | 1 0 2 3 | 1 2 0 3 | 1 2 3 0 | 3 0 1 2 | 0 3 1 2 | 0 1 3 2 | 0 1 2 3 |
| 0 1 3 2 | 0 1 3 2 | 1 0 3 2 | 1 2 0 3 | 1 2 3 0 | 3 0 2 1 | 0 3 2 1 | 0 1 3 2 | 0 1 2 3 |
| 0 2 1 3 | 0 2 1 3 | 1 0 2 3 | 1 2 0 3 | 1 3 2 0 | 3 1 0 2 | 0 3 1 2 | 0 1 3 2 | 0 2 1 3 |
| 0 2 3 1 | 0 2 3 1 | 1 0 3 2 | 1 3 0 2 | 1 2 3 0 | 3 1 2 0 | 0 3 2 1 | 0 2 3 1 | 0 1 2 3 |
| 0 3 1 2 | 0 3 1 2 | 1 0 2 3 | 1 3 0 2 | 1 3 2 0 | 3 2 0 1 | 0 3 1 2 | 0 2 3 1 | 0 2 1 3 |
| 0 3 2 1 | 0 3 2 1 | 1 0 3 2 | 1 3 0 2 | 1 3 2 0 | 3 2 1 0 | 0 3 2 1 | 0 2 3 1 | 0 2 1 3 |
| 1 0 2 3 | 0 1 2 3 | 1 0 2 3 | 2 1 0 3 | 2 1 3 0 | 3 0 1 2 | 0 3 1 2 | 1 0 3 2 | 1 0 2 3 |
| 1 0 3 2 | 0 1 3 2 | 1 0 3 2 | 2 1 0 3 | 2 1 3 0 | 3 0 2 1 | 0 3 2 1 | 1 0 3 2 | 1 0 2 3 |
| 1 2 0 3 | 0 2 1 3 | 2 0 1 3 | 1 2 0 3 | 2 3 1 0 | 3 1 0 2 | 1 3 0 2 | 0 1 3 2 | 1 2 0 3 |
| 1 2 3 0 | 0 2 3 1 | 2 0 3 1 | 2 3 0 1 | 1 2 3 0 | 3 1 2 0 | 1 3 2 0 | 1 2 3 0 | 0 1 2 3 |
| 1 3 0 2 | 0 3 1 2 | 2 0 1 3 | 1 3 0 2 | 2 3 1 0 | 3 2 0 1 | 1 3 0 2 | 0 2 3 1 | 1 2 0 3 |
| 1 3 2 0 | 0 3 2 1 | 2 0 3 1 | 2 3 0 1 | 1 3 2 0 | 3 2 1 0 | 1 3 2 0 | 1 2 3 0 | 0 2 1 3 |
| 2 0 1 3 | 0 1 2 3 | 2 0 1 3 | 2 1 0 3 | 3 1 2 0 | 3 0 1 2 | 1 3 0 2 | 1 0 3 2 | 2 0 1 3 |
| 2 0 3 1 | 0 1 3 2 | 2 0 3 1 | 3 1 0 2 | 2 1 3 0 | 3 0 2 1 | 1 3 2 0 | 2 0 3 1 | 1 0 2 3 |
| 2 1 0 3 | 0 2 1 3 | 2 0 1 3 | 2 1 0 3 | 3 2 1 0 | 3 1 0 2 | 1 3 0 2 | 1 0 3 2 | 2 1 0 3 |
| 2 1 3 0 | 0 2 3 1 | 2 0 3 1 | 3 2 0 1 | 2 1 3 0 | 3 1 2 0 | 1 3 2 0 | 2 1 3 0 | 1 0 2 3 |
| 2 3 0 1 | 0 3 1 2 | 3 0 1 2 | 2 3 0 1 | 2 3 1 0 | 3 2 0 1 | 2 3 0 1 | 1 2 3 0 | 1 2 0 3 |
| 2 3 1 0 | 0 3 2 1 | 3 0 2 1 | 2 3 0 1 | 2 3 1 0 | 3 2 1 0 | 2 3 1 0 | 1 2 3 0 | 1 2 0 3 |
| 3 0 1 2 | 0 1 2 3 | 3 0 1 2 | 3 1 0 2 | 3 1 2 0 | 3 0 1 2 | 2 3 0 1 | 2 0 3 1 | 2 0 1 3 |
| 3 0 2 1 | 0 1 3 2 | 3 0 2 1 | 3 1 0 2 | 3 1 2 0 | 3 0 2 1 | 2 3 1 0 | 2 0 3 1 | 2 0 1 3 |
| 3 1 0 2 | 0 2 1 3 | 3 0 1 2 | 3 1 0 2 | 3 2 1 0 | 3 1 0 2 | 2 3 0 1 | 2 0 3 1 | 2 1 0 3 |
| 3 1 2 0 | 0 2 3 1 | 3 0 2 1 | 3 2 0 1 | 3 1 2 0 | 3 1 2 0 | 2 3 1 0 | 2 1 3 0 | 2 0 1 3 |
| 3 2 0 1 | 0 3 1 2 | 3 0 1 2 | 3 2 0 1 | 3 2 1 0 | 3 2 0 1 | 2 3 0 1 | 2 1 3 0 | 2 1 0 3 |
| 3 2 1 0 | 0 3 2 1 | 3 0 2 1 | 3 2 0 1 | 3 2 1 0 | 3 2 1 0 | 2 3 1 0 | 2 1 3 0 | 2 1 0 3 |

$$K = U.(A.(P+\bar{Q}.\bar{R}+\bar{S}.T.\bar{Q})+B.(P+\bar{P}.Q.\bar{R}+Q.\bar{S}.\bar{T})+$$
$$C.(P.Q+P.\bar{S}.T)+D.(P.\bar{Q}+P.\bar{S}.T))+I.(C+D)$$

$$L = U(A.(Q+\bar{P}.R+\bar{P}.\bar{S})+B.(P.Q+Q.\bar{S}.T)+C.(Q+P.\bar{R}+P.T)+$$
$$D.(P.Q.+Q.\bar{R}.S))+I.(B+D)$$

$$M = U.(B.(P+\bar{P}.Q.\bar{R}+Q.\bar{S}.T)+C.(\bar{P}+R+P.\bar{Q}.S)+$$
$$D.(\bar{P}.R+\bar{Q}.R+R.T+P.Q.S.\bar{T}))+I.(A.(\bar{P}.Q+\bar{P}.R+Q.S)+$$
$$B.(\bar{P}.\bar{Q}+\bar{P}.R+P.Q.\bar{T})+(C+D).(\bar{P}.\bar{Q}+P.R))$$

$$N = U.(A.(S.\bar{T}+P.\bar{Q}.S+Q.S+\bar{P}.\bar{Q}.R.T)+B (\bar{P}.\bar{Q}.S+\bar{P}.R.S)+$$
$$C.(P.Q+P.\bar{S}.T)+D)+I.((A+B).(P.\bar{Q}+\bar{P}.S)+C.(\bar{P}.Q+$$
$$\bar{P}.\bar{T}+P.\bar{Q}.S)+D.(\bar{P}.Q+\bar{P}.R+Q.S))$$

$$\emptyset = U.(A+B.(\bar{P}.\bar{Q}+R.T+P.T+\bar{P}.R.\bar{T})+C.(\bar{P}.T+\bar{Q}.S.T+$$
$$P.\bar{Q}.\bar{S}.\bar{T}))+I.(A.(P.Q+P.\bar{S}+\bar{P}.\bar{Q}.T)+(B+C).$$
$$(P.Q+Q.T+P.T)+D.(P.\bar{Q}+P.T+\bar{P}.Q.\bar{R}))$$

Fig. 9

MEMORY SYSTEM WORD GROUP PRIORITY DEVICE WITH LEAST-RECENTLY USED CRITERION

BACKGROUND OF THE INVENTION

The invention relates to a word group priority device for assigning priorities to word groups in a store on the basis of the least-recently used criterion, where in the case of a read operation or write operation in a word group or in the case of the replacement of a word group having the lowest priority, this word group is assigned the highest priority and the priority of all word groups having a priority higher than that of this word group is lowered by one step, the device comprising a code generator for generating for each operation in the store the relevant priority codes associated with the word groups. Word group priority devices of this kind are known and are notably used in storage systems consisting of a main store having a large storage capacity and a fast buffer store having a small storage capacity. In this context, a set of information, which may be a store word and/or a number of store words which together form a block, is generally referred to as "word group". The buffer store of the storage systems serves for storing the most relevant and the most frequently used word groups. It is thus achieved that the processors of a computer system including such a storage system can operate more efficiently. The speeds of the buffer store and the processors then have the same order of magnitude. Because the capacity of the buffer store is only limited, always a decision must be taken as regards which word group must be replaced by another word group in order to satisfy at any instant the condition that the buffer store must contain the most relevant and most frequently used word groups.

A suitable and already often used criterion for the decision as regards which word group must be replaced by another word group is the "least-recently used" criterion. This means that a word group in the buffer store which has least recently been used best qualifies for replacement. In other words, a word group of this kind has the lowest priority as regards further stay in the buffer store. The other word groups in the buffer store have an increasing priority, in dependence of their history. The word group which has most recently been used and/or which has been given new contents has the highest priority.

As will be obvious from the preamble of this description, the present invention relates to a word group priority device in which the "least-recently used" criterion is embodied. The known solutions for such priority devices are often complex combinatory logic networks which produce the desired codes wherefrom the necessary replacement and priority adaptation of the other word groups of the buffer store is derived. The delay time incurred in such a network before the assignment of new priorities has been completed is very important. If this delay time is too long, the advantage of such a buffer store arrangement diminishes. In order to mitigate this drawback, proposals have been made which resulted in simpler solutions for the priority device, but these proposals introduced the drawback that the "least recently used" criterion is no longer completely satisfied. This also implies a reduction of the efficiency of such a storage system comprising a buffer store.

The invention has for its object to eliminate these drawbacks and to provide a word group priority device which has a simple construction but which still fully satisfied the "least recently used" criterion. To this end, the word group priority device in accordance with the invention is characterized in that the generator comprises means for supplying priority codes ($m$ bits), a first number of bits ($k$) of each priority code serving for the identification of the group having the lowest priority of all groups, the further ($m - k$) bits of each priority code serving for the coding of all priority combinations for the groups which do not have the lowest priority, K being smaller than $m - k$, and furthermore comprising a signal line on which it is signalled that a read operation or a write operation is performed in a word group or that a word group is replaced, and a register for storing a generated priority code (initial code) which serves, in conjunction with the signalling, as a selection code for a priority code to be newly generated, and a decoder which determines, on the basis of the first ($k$) bits of each newly generated priority code, which word group has the lowest priority. First of all, a simple code for determining the word group having the lowest priority (in view of the replacement of this group) has thus been realized. This code comprises a minimum number of bits ($k < m - k$), so that it is ensured that the determination of the group having the lowest priority is effected in the quickest manner (after minimal decoding). Secondly, the means enabling the coding of all priority combinations for the groups which do not have the lowest priority are thus also limited, notably for systems involving three to six word groups; this not only results in a saving as regards space but offers notably the advantage that little time is lost during the renewed generating of these codes.

A preferred embodiment of the device in accordance with the invention is characterized that a read-only store (suitable for rewriting or not) is used as the core of the priority generator. A further preferred embodiment of the device in accordance with the invention is characterized in that the read-only store comprises primary and secondary selection means, a generated priority code providing a primary selection in the read-only store, the signalling of the read or write operation in a word group or the replacement of a word group in the store providing the secondary selection in the read-only store.

In computer configurations utilizing such storage systems comprising a main store and a buffer store, situations occur in which a word group of the buffer store is to be invalidated, for example, if a parity error is detected. If a plurality of processors are used in a computer system and each processor comprises its own buffer store, invalidations can also occur. If a given processor modifies a word group in the main store, the word group also being present in a buffer store of a different processor, this word group must be invalidated.

For the present invention it is important to establish what can be done with such an invalidation signalling, regardless the origin of such an invalidation. Thus far, according to this signalling only a special bit was added to the address of the relevant word group present in the address store associated with the buffer store. During the comparison of an address of a requested word group with the addresses, present in the address store, of the word groups present in the buffer store, it could be seen that a given word group was invalid and access to the relevant address in the main store itself had to be effected. The construction of the word group priority device in accordance with the invention also enables simple use of this invalidation signalling in a different manner. To this end, the word group priority device in accordance with the invention is characterized in that there is provided a signalling line on which it is signalled that a word group has been invalidated, the generator comprising further means for generating priority codes in accordance with the defined code, the invalidated word group being assigned the lowest priority and the priority of all groups having a priority lower than that of this group being raised by one step, a priority code (initial code) stored in the register serving, in conjunction with the signalling of the invalidation, as a selection code for the priority code to be generated by the generator. It is thus achieved that a word group which is invalid anyway, first qualifies for replacement by another word group, because this word group has been assigned the lowest priority. Moreover, in the device in accordance with the invention it is also possible for the signalling of the invalidation of a word group to provide the secondary selection in the read-only memory.

Finally, in view of the high cost of hardware e.g., (decoders), it is more advantageous to produce the priority codes from storage, using a minimum number of bits, to specify the codes for the group having the lowest priority.

The invention will be described in detail hereinafter with reference to the Figures, without the scope of the invention being restricted thereby.

BRIEF DESCRIPTION OF THE DRAWING

FIG. 2 shows a table containing a number of codes indicating the lowest priorities.

FIG. 3 shows a table containing the digit codes of the priorities for $n = 3$ word groups.

FIG. 4 shows a table containing the binary codes of the priorities for $n = 3$ word groups.

FIG. 7 shows a table containing the digit codes of the priorities for $n = 4$.

FIG. 8 shows a table containing the binary codes of the priorities for $n = 4$.

FIG. 9 shows the switching formulas for a combinatory logic network for the example involving $n = 4$ word groups.

DESCRIPTION OF THE PREFERRED EMBODIMENTS

Figure 1:
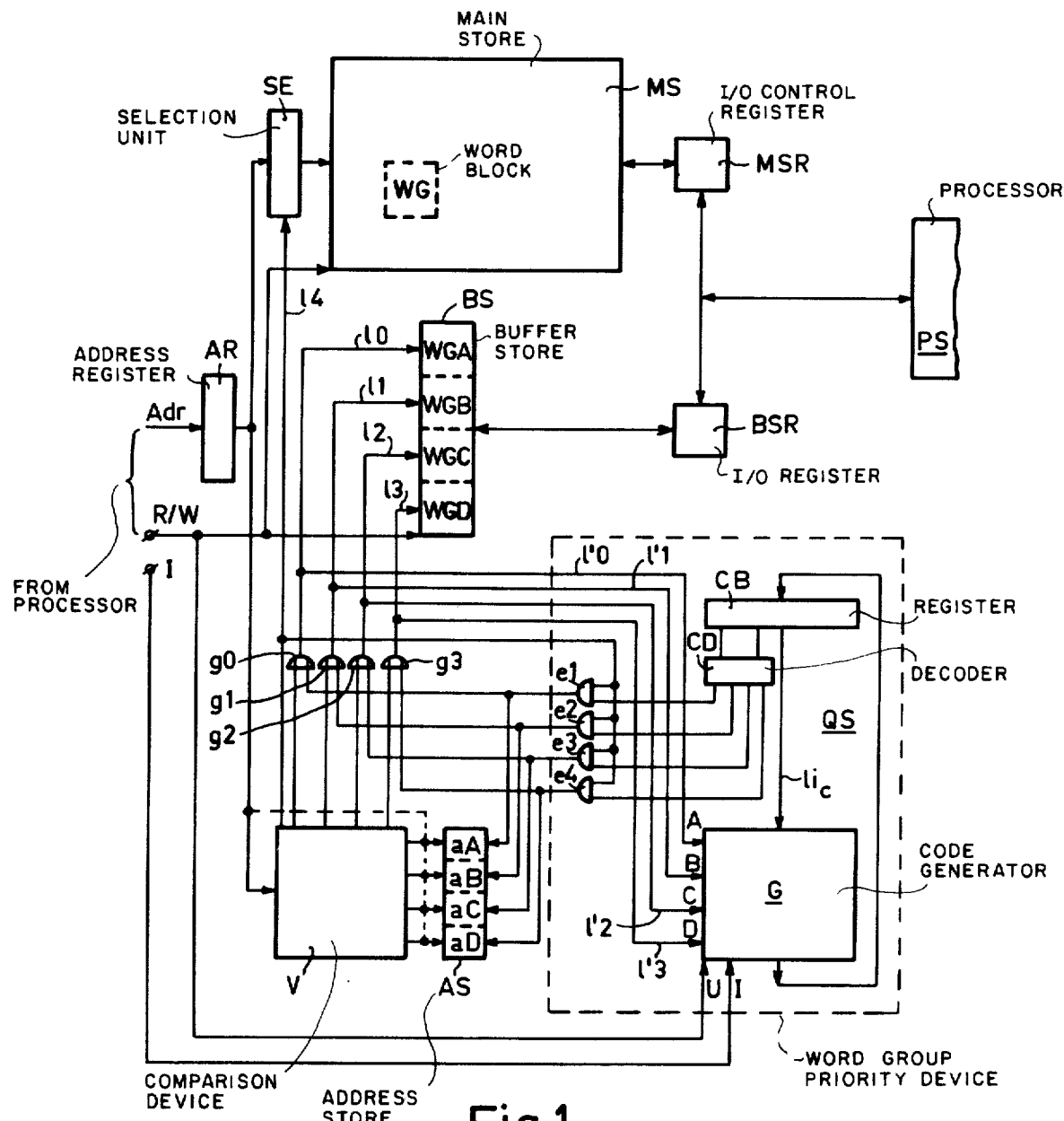
FIG. 1 shows a storage system in which the word group priority device can be used.

FIG. 1 shows a storage system in which the word group priority device QS can be used. FIG. 1 is given in order to illustrate the "surroundings" of the device QS for a simpler explanation of the function and the operation of QS. The storage system shown in FIG. 1 is a system which is known per se; see for example, Netherlands Patent application No. 7317545. The reference MSR denotes the main store, comprising a selection unit SE whereby, when an address Adr is presented which is present in an address register AR and which originates from a processor PS, a word group WG in the main store MS can be selected. On the line R/W it is indicated whether or not a "read" or "write" operation takes place. The reading/writing of a word group WG is effected via the input/output register MSR, after which the word group can be transferred notably to the processor. The reference BS denotes the buffer store which may in this case contain, for example, four word group, WGA, WGB, WGC and WGD. The input/output register of BS is denoted by the reference BSR. There are also provided an address store AS and a comparison device V. Another possibility consists in that the address store is an associative store, in which case the comparison device V can be dispensed with. The address store can contain as many addresses as BS can contain word groups. The positions of the addresses are denoted by the address positions aA, aB, aC and aD. In the comparison device V an address Adr, applied to the register AR, is compared with the addresses present in the address store AS. This can be effected simultaneously for all addresses (associatively) or consecutively. If one of the addresses corresponds, a relevant line 10, 11, 12 or 13 is activated, via one of the OR-functions $g0$, $g1$, $g2$, $g3$, the word group associated with the relevant address then being selected in the buffer store BS. Again it is indicated on the line R/W whether or not a "read" or "write" operation takes place. The contents of this word group can then be transported, via the register BSR, to the processor PS (read operation). In the case of write operation, the contents of BSR are written in the selected word group (write operation). The buffer store is thus updated by these operations. In addition, as has already been stated in the preamble of the description, an invalidation of a word group in the buffer store can also take place. In such a case an address Adr is accompanied by an invalidation signal on the signal line I.

The word group priority device QS then also starts to play a role: a register CB of QS contains a priority code which indicates the priorities of the word groups on the basis of the previous occurrences in the system. This is the initial code which is applied, via the line Iic (a bundle of lines in practice), to the code generator G of the device QS. G comprises further inputs A, B, C and D which are connected, via the lines 1'0, 1'1, 1'2, and 1'3, to the lines 10, 11, 12 and 13. If a read or write operation (R/W) has been performed in a given word group (on the basis of an address Adr) of BS, an appropriate signal is applied to an input of the code generator G which is denoted by the reference U (update). Starting from the initial code present, G then generates, on the basis of the signals present on one of the signals present on one of the inputs A, B, C or D and on the input U, a new code which represents the new situation. In this case, utilizing the least-recently used criterion in accordance with the invention, this means that the group receiving new contents obtains the highest priority and that the priority of all groups having a higher priority than the group is lowered by one step. However, if a word group of the buffer store is invalidated, the relevant input A, B, C or D of G is actuated via the line 1'0, 1'1, 1'2 or 1'4, and this fact is also signalled to the input I of G via the line I. Using these signals, G then generates a new code on the basis of an initial code present in the register CB, the new code representing this new situation. This means in this case that, as has been emphasized above, the group which is invalidated is assigned the lowest priority (so that it may be replaced first) and that the priority of all groups initially having a priority lower than that of the group is raised by one step.

In the case where a word group WG having the address Adr is not present in the buffer store BS, no correspondence occurs for this address Adr in the device V. This is signalled on the line 14 and the word group is selected in the store MS. Via the register MSR, a read or write operation can be performed. In this situation the following also occurs: the contents of this word group are also applied to the register BSR, because on the basis of this storage system principle the most recently used word group is directly taken up in the buffer store BS.

For the storage in BS, normally speaking another word group will have to be removed from BS. The "least-recently used" criterion stipulates that, upon replacement of a word group, the relevant word group takes the place in the buffer store of the word group having the lowest priority. As a result of this replacement, the contents of the buffer store are also updated. In the new situation, this word group containing the new information has the highest priority and the priority of all groups which had a priority higher than that of the group is lowered by one step. Therefore, in the device shown in FIG. 1 a decoder CD is connected to the left side of the register CB, the decoder determining, on the basis of the priority code, which of the four groups A, B, C or D has the lowest priority. In conjunction with the signal on the line 14 (see above), one of the AND-function gates $e1$, $e2$, $e3$ or $e4$ will then be opened. Thus, via one of the OR-gates $g0$, $g1$, $g2$ or $g3$ and via one of the lines 10, 11, 12 or 13, it is ensured that the contents of BSR are stored in the correct position in BS. Via one of the gates $e1$, $e2$, $e3$ or $e4$, it is also ensured that the relevant address Adr is stored in AS, either via the comparison device or directly from the register AR (dotted line). Finally, the priority code is also adapted to this new situation by the word group priority device QS. The code generator G generates a new priority code on the basis of the previous code in CB, in conjunction with the signal on the relevant line 10, 11, 12 or 13 and the updating signal on the line R/W. As far as the generating of the new priority code is concerned, the latter case is similar to the previously described read/write operation in a word group of BS, without a replacement taking place.

The importance of fast generation of a new priority code will be obvious from the foregoing, because further processing is impossible until the register CB contains a new code. Moreover, this code must also be as simple as possible as far as the part to be decoded in CD is concerned. This is because it is advantageous to know as quickly as possible (for example, after one logic level) which word group has the lowest priority (in view of replacement).

The word group priority device QS in accordance with the invention will be described in detail hereinafter. The basic aspect of this device in accordance with the invention is the generating of the priority codes which comprise $m$ bits, the first $k$ bits of each code serving to identify the group having the lowest priority P min. of all groups $n$. This is important to keep the coding as simple as possible, so that it is substantially directly known which word group is assigned to have its present information replaced by new information. If there are $n = 3$ word groups for which the priority codes have to be supplied, $k = 2$ bits are required to enable direct indication as to which group of the three groups A, B or C has the lowest priority P min. In that case there is one code which remains as "irrelevant" (*), see FIG. 1. If there are $n = 4$ word groups, again $k = 2$ bits are required to indicate which of the four groups A, B, C or D has the lowest priority P min, see FIG. 2. Similarly, for $n = 5$ groups A, B, ... E, $k = 3$ bits are required and for $n = 6$ groups again $k = 3$ bits are required. These codes P min. are also shown in FIG. 2.

The remaining $m - k$ bits of the priority codes serve for coding all priority combinations for all groups which do not have the lowest priority. In the case of $n = 3$, there are $(3 - 1)! = 2$ combinations, so that $m - k = 1$ bit suffices. (In this case, there are in total $m = 3$). If for $n = 3$ the priorities Pr are numbered in a decreasing manner with 0,1 and 2, the lowest priority P min. equals 2. The remaining combinations for the word groups having a priority other than the lowest priority are then 0,1 and 1,0. The first combination (0,1) can be denoted by a bit = 0, while the second combination can be denoted by the same bit = 1.

On the basis of these considerations, a table as shown in FIG. 3 can be composed for $n = 3$. The left-hand column contains the initial situations (starting situations) which may occur: within a column the priorities of the groups A, B and C are shown from left to right. The next three columns, headed by the caption U, indicate under A, B and C which priorities (in numerical sequence) arise for the relevant groups A, B and C if the word groups A, B and C, respectively, are read or provided with new information, i.e. for which an R/W signal appears, that is to say a signal on the input U of G (see FIG. 1). The table shows that all conditions for the priorities are satisfied: the group in which a write or read operation is performed receives the highest priority (0). Replacement of the contents of a word group having the lowest priority by new contents (in the case of transport of a new word group from the store to the buffer store (see above)) is also illustrated in these columns which are denoted by U: for example, first line: replacement of the contents of the word group C which (left-hand column) has the lowest priority and which subsequently obtains the highest priority (fourth column from the left) can thus be effected. Similarly, the second line: replacement of the contents of the word group B .... The three right-hand columns, denoted by I, show the priorities which arise if, in accordance with the special aspect of the invention, the contents of the word groups A, B or C, respectively, are invalidated, based on the situations given in the extreme left column.

The binary interpretation of the contents of the table of FIG. 3 is shown in the table of FIG. 4 on the basis of the described coding.

Figures 5, 6:
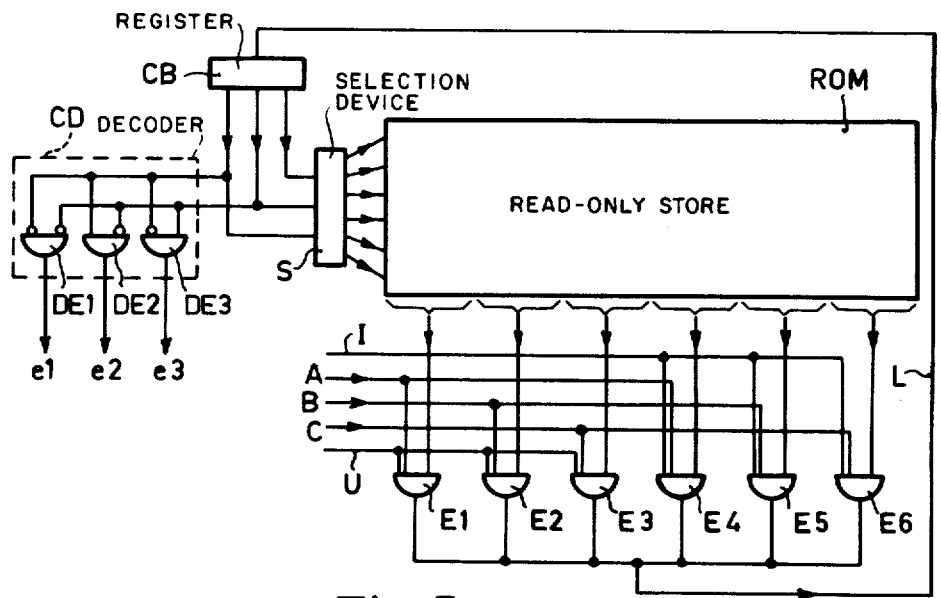
FIG. 5 shows a word group priority device in accordance with the invention for $n = 3$.
FIG. 6 shows a table containing priority sequences for $n = 4$.

FIG. 5 shows an example of the constituent means of the word group priority device. This example relates to the case involving $n = 3$ word groups. The inputs and outputs of the word group priority device can be seen in FIG. 1, be it that FIG. 1 is based on 4 (A, B, C and D) while FIG. 4 is based on 3 groups (A, B and C). The described priority code generator G (see FIG. 1) in the embodiment of FIG. 5 consists of a read-only store ROM (erasable and rewritable or not) which comprises a primary selection device S for addressing in the store, the device S receiving address codes, in this case in the form of priority codes. These codes are the initial codes which may be present as output position codes in the register CB. The link between FIG. 4 and FIG. 5 will be obvious: the left-hand column of FIG. 4 states the initial codes which may be present in CB. On each of these codes, an ROM-word (in this case there are six) can be selected. The contents of such a word correspond to the code stated on the same line behind the relevant initial code of FIG. 4. The code which will be present as the new code for a new output position in the register CB (secondary selection) is determined by the occurrences elsewhere in the system: if a write operation or read operation is effected in one of the groups, or if a group is replaced, signalling occurs on the inputs A, B or C and U; if one of the groups is invalidated, signalling occurs on the inputs A, B or C and I. Such a signal on one of the inputs selects the relevant code from the word which has been selected by the initial code in the store ROM itself. This second selection is in this case effected by way of the AND-function gates E1, E2, . . . E6. FIG. 4 directly shows which code is in all cases applied to CB via the lines L (3 bits as indicated in the FIG. by (3)). The decoding in order to determine the group having the lowest priority of all groups is simply effected on the basis of the foregoing by the decoding of the first two bits of each priority code in CD. In this example, the decoder CD consists of three AND-function gates DE1, DE2 and DE3 which receive the first two bits themselves or the inverted form thereof (denoted by a dot on the input). For the group which has the lowest priority on the basis of the codes in the column $n = 3$ of FIG. 2, a signal appears on the output of DE1 (for the group A), DE2 (for the group B) and DE3 (for the group C). These outputs are connected to the AND-function gates $e1$, $e2$ and $e3$, respectively (as shown in FIG. 1) for the further processing of this signal.

It appears from the foregoing that the object of the invention has been achieved in a very simple manner. The decoding of the group having the lowest priority is effected over only one logic level (gate DE1, DE2 or DE3). The generating of a new code after each change of the status of the system is unambiguously determined by the contents of the store ROM.

Figure 8:
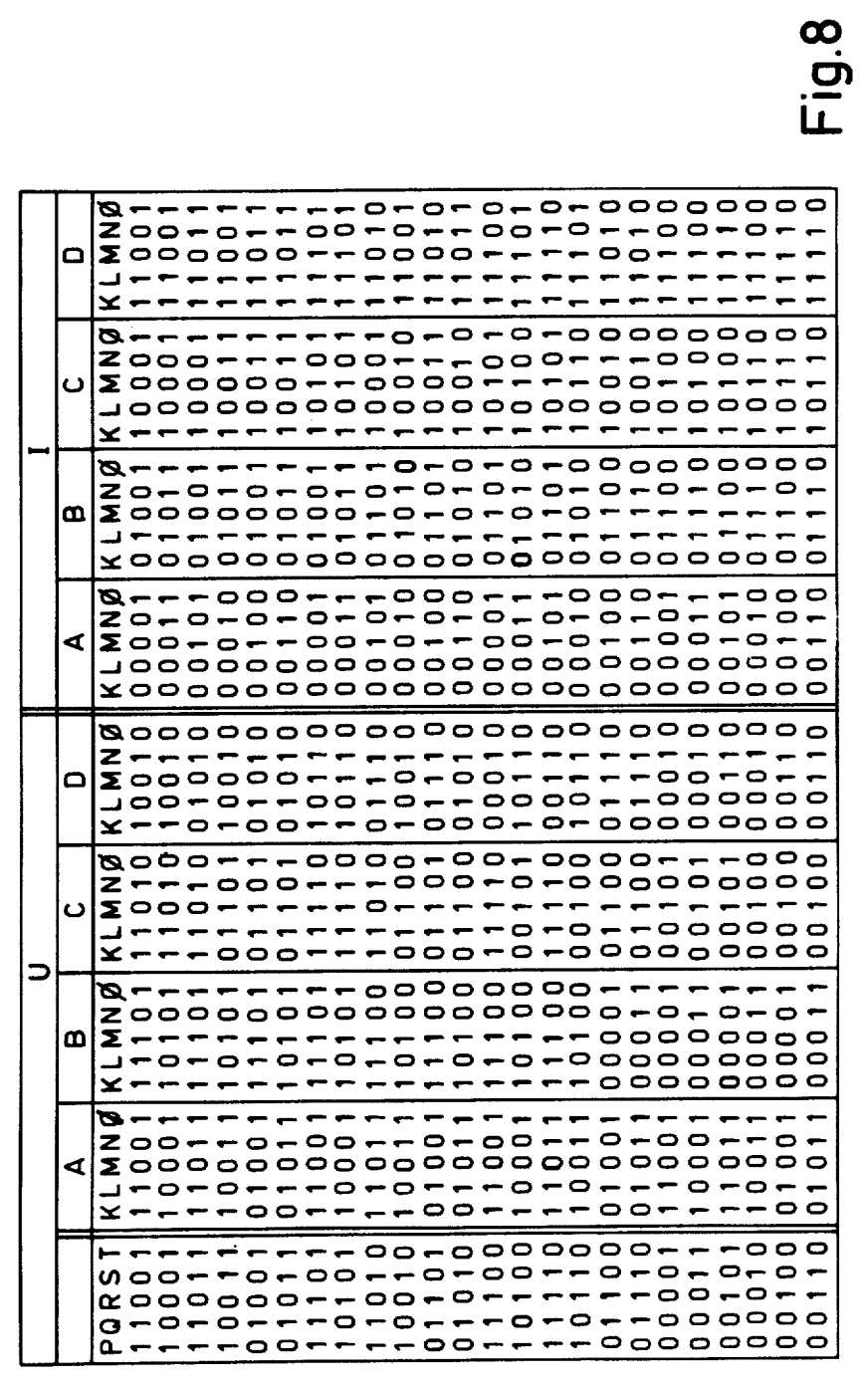

It is to be noted that A, B, C (and also D in accordance with FIG. 1) can be applied as a primary selection together with the initial codes, be it that a relevant code must then be provided. The secondary selection is thus eliminated, but the combination of primary and secondary selection is to be preferred in view of speed. If there are $n = 4$ groups, $k = 2$ bits are also required for determining the word group having the lowest priority (see FIG. 2 for $n = 4$). In order to enable indication of all priority combinations for all groups which do not have the lowest priority, $m - k = 3$ bits are required, because there are $(4 - 1)! = 6$ of such combinations feasible. As appears from the example of the table of FIG. 6, the priority sequence 0,1 and 2 can be stored in these $m - k = 3$ bits. The codes 000 and 111 are not relevant in this respect (*). The left-hand column states the feasible priority sequences PV, while the right-hand column contains the bit code BC. As has already been stated, the lowest priority (number 3) is given below $n = 4$ in FIG. 2. The complete table of all feasible cases can be readily composed on the basis of these data. FIG. 7 first of all shows the table which again shows all possibilities, denoted by the priority digits 0, 1, 2 and 3. The lay-out of this table fully corresponds to the table shown in FIG. 3. FIG. 8 shows the complete table for the relevant binary codes. Thus, this table is composed of the codes shown in FIG. 2 (column $n = 4$), FIG. 6 and FIG. 7. The left-hand column of FIG. 8 again contains the initial codes, the relevant bits of which are denoted by the letters P, Q, R, S and T. The codes to be generated are given in the further columns. The bits thereof are denoted by the letters K, L, M, N and O.

As has already been described for the table of FIG. 4, this table of FIG. 8 can serve, except for the extreme left-hand column, as the contents of a read-only store ROM as shown in FIG. 5. The codes of the extreme left-hand column serve as address codes for this ROM. The further use is the same as described for the example of FIG. 5, which must be extended only by an input D and a few AND-function gates E (for the combining of the input D with U and I, respectively, and an AND-function gate $e4$ which is added to CD). See also FIG. 1, which illustrates the example for $n = 4$ word groups in the complete storage system.

Figure 10:
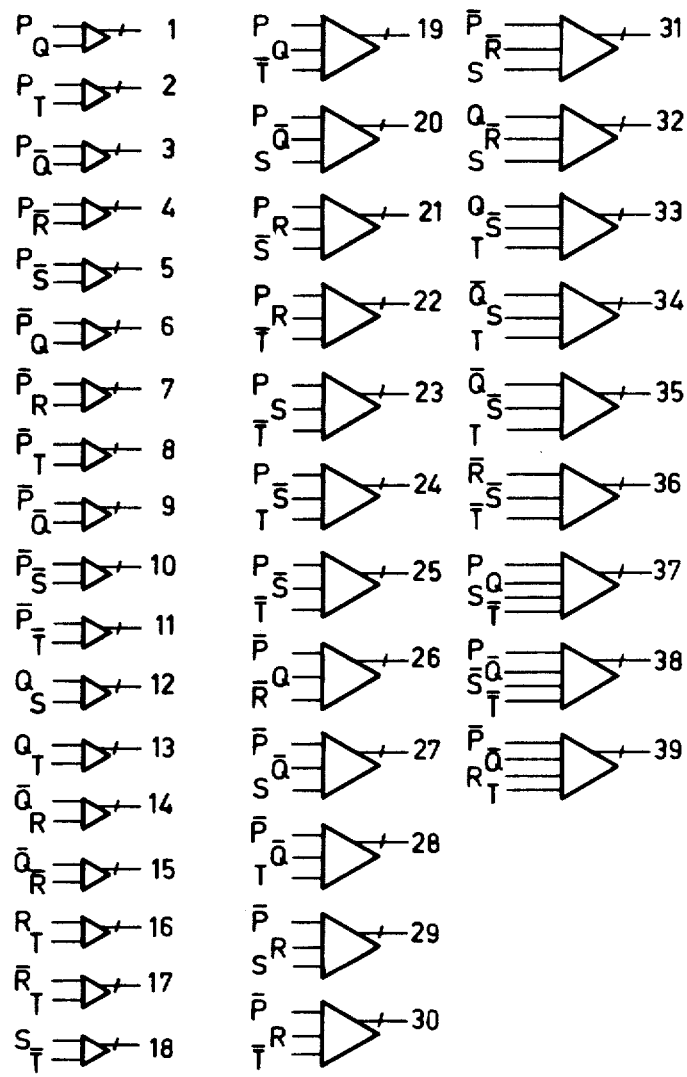
FIGS. 10 and 11 show a combinatory network based on the switching formules of FIG. 9.
Figure 11:
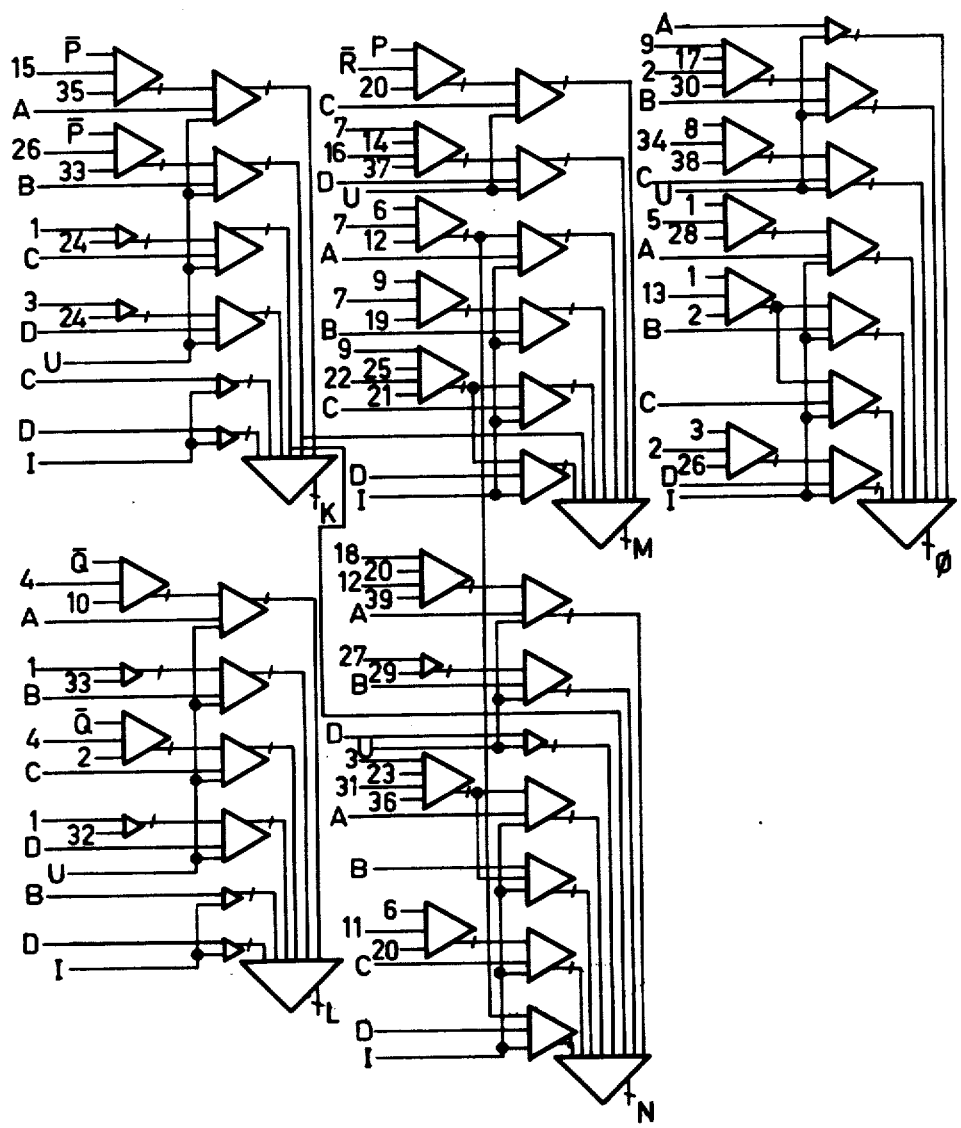

The use of a read-only store ROM (rewritable or not) is not the only feasible solution for generating all the codes. On the basis of a table as shown in FIG. 4 or FIG. 8, it is alternatively possible to compose a combinatory logic circuit which performs the same function. This can be effected in known manner by way of the so-termed Karnaugh maps by means of which the switching formulas can be found. For completeness' sake, FIG. 9 shows the switching formulas for $n = 4$ which can be obtained in this manner. Improvements must yet be made herein: the $m = 5$ bit code in principle offers $2^5 = 32$ combinations, of which only $4! = 24$ may be used. Consequently, there are 8 irrelevant combinations. In this case these are the combinations terminating with 000 and 111. See also the table of FIG. 6, in which these combinations are omitted. A combination of this kind could arise due to a failure during reading or writing. By modifying the switching formulas obtained from the Karnaugh maps it can be achieved that the irrelevant combinations, should they occur, immediately disappear again upon a subsequent access. This improvement concerns: for bit M the part ($\bar{P}\bar{Q} + P \cdot R$) should become: ($\bar{P}\bar{Q} + P \cdot \bar{S} \cdot \bar{T} + P \cdot R \cdot \bar{T} + P \cdot R \cdot \bar{S}$) and for bit N, the part ($P\bar{Q} + \bar{P}S$) should become ($P\bar{Q} + \bar{P} \cdot S \cdot T + \bar{P} \cdot R \cdot S + R \cdot S \cdot T$). The logic circuit is shown in FIG. 10 and FIG. 11. The priority code register CB (see FIG. 1) contains an initial code (bits P, Q, R, S and T) which is applied directly as well as in inverted form, $\bar{P}, \bar{Q}, \bar{R}, \bar{S}$ and $\bar{T}$, to the logic circuit of FIG. 10 and FIG. 11. The further inputs are the input U (update) and the input I (invalid) and the inputs A, B, C and D on which it is indicated which of the groups A, B, C or D is concerned: see FIG. 1: the inputs of the generator G. The delta symbols whose output is indicated by a symbol/- denote NAND-function gates. The numbered inputs and outputs serve only to indicate the connections present in the logic circuit itself. The result of the treatment of a given input code (initial code) P, Q, R, S, T, together with the signal U, I and A, B, C and D generated by this circuit, appears on the outputs thereof in the form a new code K, L, M, N, O (FIG. 11).

If there are $n = 5$ word groups, $k = 3$ bits are required for direct detection of the group having the lowest priority on the basis of the first (3) bits of a relevant code (see FIG. 2, column $n = 5$). In order to enable indication of all priority combinations $4! = 24$ for the remaining groups ($5 - 1 = 4$), five further bits are required, so $m - k = 5$ bits. All possible combinations in this case amount to $5! = 120$. The number of initial codes, therefore, also amounts to 120. In the case of $n = 5$ groups, there are five update situations U in combination with A, B, C, D and F, respectively, and also five invalid situations I in combination with A, B, C, D and F, respectively. Thus, in total there are 10 groups of 8 bit codes for 120 different situations. On the basis of these data a table similar to that of FIG. 4 and FIG. 8 could again be composed. When a ROM is used as the generator G for the codes, a capacity of 120 words (initial code inputs) comprising 8 × 10 = 80 bits is required. Such an ROM can be readily composed from existing IC ROMs. Similarly, a set-up for $n = 6$ word groups can be elaborated etc. However, it will be obvious that the ever increasing number of feasible combinations imposes limits as regards practical realizability.

What is claimed is:

1. For use with a data processing system having a processor and a storage configuration including a first store and a relatively faster second store, wherein data is organized in each of said stores in word blocks each having a predetermined number of words of data, with each of said word blocks in said second store having a relative priority at any given time assigned on the basis of the least-recently-used criterion, and the number of words in said second store being less than the number of words in said first store, the combination comprising:

means for supplying from said processor the word block address of a predetermined word block for addressing individual word blocks within said first and second stores;

means for storing said predetermined word block address;

address store means for storing addresses of word blocks stored in said second store;

comparison means for comparing said stored predetermined word block address with said addresses stored in said address store means and for producing a selecting signal on a selection line connected to said second store for selecting the addresses word block;

a code generator having an input connected to said selection line and an output for generating an $m$-bit priority code for each of said word blocks, said code comprising $k$-bits for identifying the one word block having lowest priority and $(m-k)$-bits for coding all priority combinations for the other of said word blocks not having lowest priority, where $k$, $m$, and $m - k$ are positive integers;

means connected to said code generator for supplying from said processor a signal that a read/write operation on one of said word blocks is occurring;

register means connected to said output of said code generator for storing a newly generated priority code and having a $k$-bit output; and decoder means having an input connected to said $k$-bit output of said register means and an output connected to said address store means for specifying which one of said word blocks has the lowest priority.

2. A data processing system as defined in claim 1, wherein said code generator comprises a read only memory.

3. A data processing system as defined in claim 1, wherein said code generator comprises:

primary selection means comprising a read only memory;

means for addressing said memory and having an input connected to said register means and an output; and secondary selection means comprising logic means having an input connected to the output of said read only memory, to said selection line, and to said means connected to said code generator for supplying a signal that a read/write operation is occurring, and said secondary selection means having an output connected to said register means.

4. A data processing system as defined in claim 1, further comprising means connected to said code generator for signalling that a word block has been invalidated so that said invalidated word block is assigned the lowest priority by said code generator.

* * * * *